June 13, 1950 — G. HAINLEN — 2,510,974
SAFETY INNER TUBE FOR PNEUMATIC TIRES
Filed Feb. 14, 1945
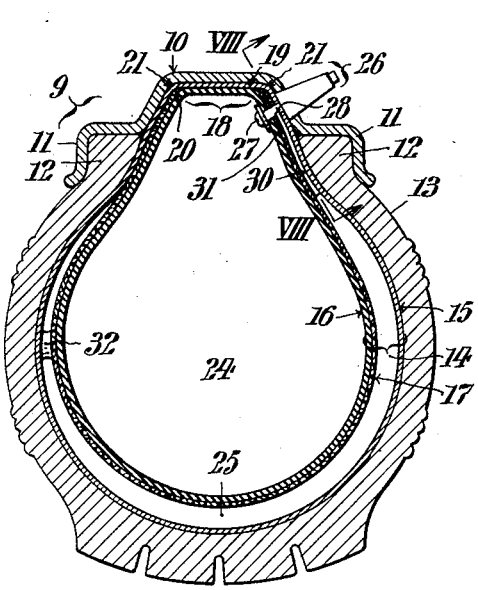
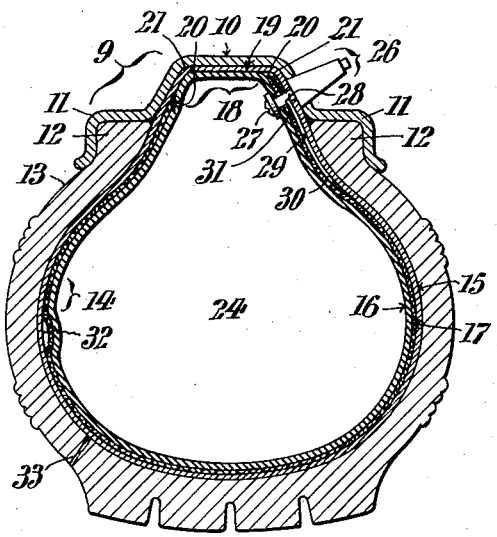
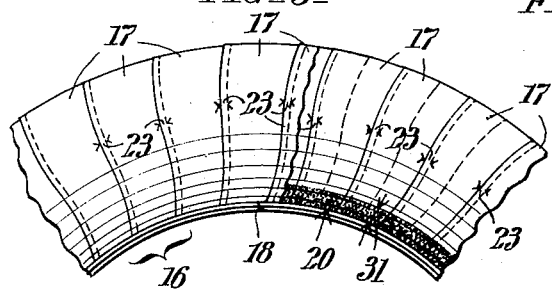
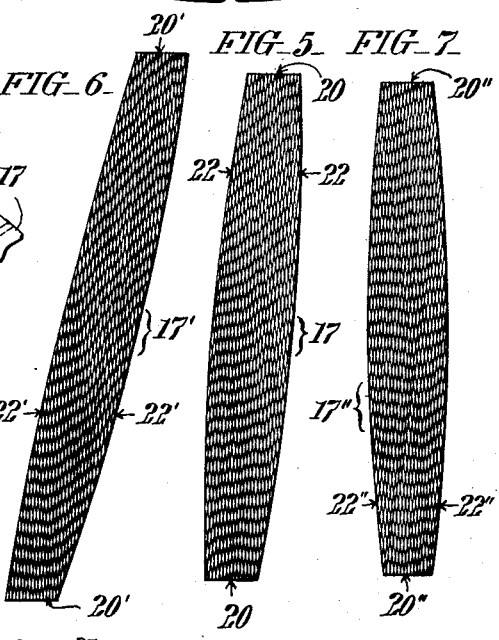
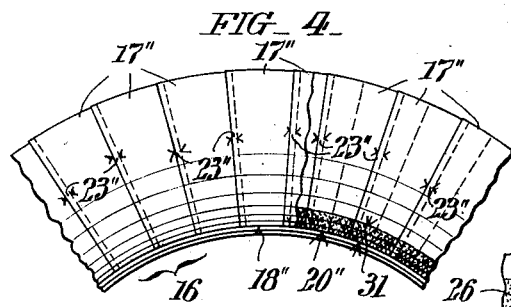
WITNESSES
Hubert Fuchs
Thomas W. Kerr, Jr.
INVENTOR:
George Hainlen,
BY Paul & Paul
ATTORNEYS.

Patented June 13, 1950

2,510,974

UNITED STATES PATENT OFFICE 2,510,974

SAFETY INNER TUBE FOR PNEUMATIC TIRES

George Hainlen, Philadelphia, Pa.; Anna Hainlen executrix of said George Hainlen, deceased Application February 14, 1945, Serial No. 577,817

6 Claims. (Cl. 152—342)

This invention relates to safety-inner tubes for pneumatic tires and is a continuation in part of my co-pending application Serial No. 371,295, filed December 23, 1940, now abandoned. It is concerned, more particularly, with what I term a double-safety inner tube which normally serves to expand and properly sustain a tire casing in securely attached position around the rim of a conventional vehicle wheel, but which in the event of a puncture or fracture will also support said tire casing, in effective tractive condition until the repair can be carried out.

My invention has for its primary object the provision of a simple and inexpensive double-walled air-tube for pneumatic tires embodying relatively separate outer and inner chambers, capable of conjoint inflation to an appropriate load sustaining pressure.

Another object is the provision of an air-tube of the kind referred to in which the outer surface of the inner chamber wall is reinforced by a novel arrangement of protective reinforcing mesh fabric elements cut on the bias and applied under tension so as to have capacity for expansion and contraction conformable to, and with, inflation or deflation of said tube.

A further object of this invention is to provide a safety-inner tube for pneumatic tires which has an outer wall with an inner, mainly spacially-related, wall including a fabric reinforcement arranged so that, when the inner tube is placed about a drop-center wheel rim and within the associated tire casing, said reinforcement substantially surrounds the inner wall, or is of a dimension to flank the inner sides of the drop-center groove portion of the wheel rim as well as the mergingly-related confronting sides of the tire casing, with an intervening free rubber thickness snugly embracing the bottom or well portion of the wheel rim.

Other objects and attendant advantages will appear from the following detailed description of the attached drawings, wherein Fig. 1 is a transverse sectional view of a tire mounted on a rim adapted for application to a conventional automobile wheel, said tire having associated with it a safety-inner tube conveniently embodying my invention, with the tire in inflated or service condition.

Fig. 2 is a similar sectional view of the tire as it appears when partially deflated incidental to a puncture of the casing.

Fig. 3 is a fragmentary view in side elevation of the safety-inner tube of Figs. 1 and 2.

Fig. 4 is a similar side view showing a modified arrangement of the fabric reinforcement.

Fig. 5 is a detail view illustrating one of the preformed reinforcing elements as blanked-out on the bias from suitable mesh fabric and stretched ready for application to the inner tube with what may be termed single-pitch arrangement.

Fig. 6 is a similar view of a reinforcing element as blanked-out and stretched for application to the inner tube in double-pitch arrangement.

Fig. 7 is a corresponding view of a reinforcing fabric element as blanked-out and ready for application on radial lines to the inner tube and corresponding to Fig. 4; and, Fig. 8 is a fragmentary detail view in section taken as approximately indicated by the angled arrows VIII—VIII in Fig. 1.

In describing the form of the invention exemplified in the drawings, specific terms will be employed for the sake of clarity, but it is to be understood the scope of said invention is not thereby limited; each such term being intended to embrace all equivalents which perform the same function for an analogous purpose.

With more detailed reference to these illustrations, the numeral 9 indicates a standard type of metallic wheel rim having a central circumferential channel depression 10 and flanking circumferential flange portions 11 on which the beads 12 of the conventional tire shoe 13 seat.

The safety tube with which the present invention is more especially concerned is comprehensively indicated at 14 and as shown, comprises two hollow annular components 15 and 16 of relatively thin rubber or the like, one disposed within the other. The two components of the inner tube are inflated to the same pressure with the result that the parts normally assume the relationship in which they are shown in Fig. 1. On its outer surface the inner component 16 has a protective reinforcing covering which is formed by a plurality of marginally overlapped segmental strips 17 of suitably strong mesh fabric spirally laid over an area corresponding substantially to that of the inner surface of the shoe 13, so that a peripheral area 18 of liberal width of bare rubber is left exposed at the internal periphery of said component between the opposite edges 20 of the covering. As shown in Fig. 1 the exposed area 18 contacts with a corresponding area 19 of the outer component 15 within the channel hollow of the rim 10 when the tire is in place. From Fig. 1 it will also be noted that normally the edges 20 of the reinforcing covering reach substantially to the inner corners of the central depression in the wheel rim 10. The reinforcing strips 17 may be secured by cementing or they may be permanently incorporated during curing or vulcanizing of the rubber as found desirable or expedient in practice. Each of the strips 17 is cut from the fabric on the diagonal or bias, and for single-pitch spiralizing is shaped and dimensioned as shown in Fig. 5, with straight end edges 20 and convex side edges 22, the curvature of the latter being such as to determine overlap as at 23 in Fig. 3 of the strip with its immediate neighbor on the surface of the tube component 16 along parallel lines. Prior to application to the tube each segment 17 is stretched lengthwise so that the meshes of the fabric are closed transversely as conventionally indicated in Fig. 5 for a purpose later on explained. For double-pitch spiralizing, I provide strips such as separately illustrated at 17' in Fig. 6. The strip 17' is somewhat longer than the strip 17 previously described and somewhat differently shaped as required, nevertheless having straight cut end edges 20' and convex side edges 22'.

As an alternative the protective covering may be formed as shown in Fig. 4 from segmental strips 17" arranged radially in marginally overlapping relation and individually cut to the configuration shown in Fig. 7 with square end edges 20" and suitably convexed side edges 22".

As a further alternative, plural layers of the strips 17, 17' and 17" may be employed as shown at the right-hand respectively of Figs. 3 and 4 with the strips of one layer alternating or being staggered in respect to those of the adjoining layer.

In order that air under pressure may be introduced into the chambers 24 and 25 of both components of the inner tube concurrently, I have provided a valve element 26 which has an end port 27 open into the hollow 24 and a lateral outlet 28 in registry with the slot 30 of a spacing piece 29 (see Fig. 8) disposed tranversely of a relatively narrow annular juncture area 31 along which the two components are permanently united by cementing or otherwise incident to manufacture of the tube. The slot 30 forms a duct-like passage from the lateral outlet 28 of the valve element 26 and, as shown in Fig. 1, the spacing piece 29 is of sufficient length to maintain the two tube components 15 and 16 separated to a point well beyond the level of the rim 9 to insure the maintenance of a channel to the space between said components.

For the purpose of keeping the inner component 16 from normally swaying laterally and rubbing against the outer component 15 of the inner tube when side thrusts are imposed upon the shoe 13, I further spot connect the two components flexibly at either or both sides at circumferentially spaced points as instanced at 32 in Fig. 1.

From the foregoing it will be readily understood that with the parts assembled as shown and described, when the chambers 24, 25 are inflated to the required pressure, the reinforced inner components 16 will be ballooned or expanded to the extent shown between the chambers 24, 25 each of the latter containing air at the same desired pressure, for example about thirty pounds; while the outer component 15 will be fully expanded into firm contact with the tire casing 13 and between the bead portions 12 of the latter, and also retentively forced into the channel of the wheel rim 10. Due to the manner in which the inner component 16 is supported there will be no friction between it and the component 17 normally. Thus heat development by contact rubbing and unnecessary wear are entirely obviated.

If a puncture or rupture of the tire casing 13 occurs, such as indicated at 33 in Fig. 2, with attendant escape of air from the outer chamber 25, that contained in the inner space 24 will automatically cause the inner tube component 16 to immediately expand into contact with the outer component 15. Under these conditions the shoe 13 is not given the opportunity to flatten out so that the vehicle is supported substantially as before. Expansion of the inner component in the manner described is made possible due to the capacity of the protective covering to expand circumferentially of the tire, and the bare portion 18 of said component to allow stretching transversely. It will however be realized that the stretch of the fabric covering is confined to a definite limit so that no blow-outs can occur even if the tire shoe is severely ruptured.

Having thus described my invention, I claim:

1. A safety inner tube for use in a tire casing comprising two hollow annular components, of rubber or the like, connected over a relatively small area with provision of an interspace between them; a protective covering on the inner component extending substantially thereabout with provision of an intervening perimetrical free rubber area; said covering consisting of mesh fabric elements cut on the bias and longitudinally stretched to approximately close the mesh transversely preparatory to application on the inner tube component to enable a different stretch perimetrically of said component relative to the adjacent surface of the tire casing when the pressure in the interspace aforesaid exhausts incidental to puncturing of the outer tube component; and valve means for conjoint admission of load sustaining pressure to the interior of the inner component and into the interspace between them.

2. The invention according to claim 1, wherein the two components of the inner tube are permanently connected along a comparatively narrow circumferentially-extending area radially outwards from the inner confines of the tire casing.

3. The invention according to claim 1 wherein the protective covering on the inner component is formed by adjacently overlapped transversely applied strips of mesh fabric elements cut on the bias and lengthwise stretched before application to said inner component with provision of an intervening free rubber thickness for seating in the hollow of a wheel rim.

4. The invention according to claim 1 in which the protective covering on the inner component is formed by adjacently overlapped spirally applied strips of mesh fabric cut on the bias and lengthwise stretched to close the mesh transversely before application to said inner component.

5. The invention of claim 1 wherein the protective covering on the inner component is formed by plural layers of adjacently overlapped transversely applied strips of strong mesh fabric cut on the bias, with the strips of one layer partially overlapping an adjacent one in respect to those of the adjoining layer.

6. The invention according to claim 1, in which the protective covering on the inner component is formed by plural layers of adjacently overlapped spirally applied strips of strong mesh fabric cut on the bias, and wherein the strips of one layer partially overlap an adjacent one with respect to those of the adjoining layer or layers.

GEORGE HAINLEN.

REFERENCES CITED

The following references are of record in the file of this patent:

UNITED STATES PATENTS

| Number | Name | Date |
|---|---|---|
| 1,109,939 | Reason | Sept. 8, 1914 |
| 2,027,212 | Arey | July 9, 1940 |
| 2,305,053 | Zimmerman | Dec. 15, 1942 |
| 2,354,912 | Eger | Aug. 1, 1944 |

FOREIGN PATENTS

| Number | Country | Date |
|---|---|---|
| 143,644 | Great Britain | 1920 |
| 456,294 | Great Britain | 1936 |
| 118,297 | Australia | 1944 |